C. H. ALLEN AND J. L. MORRIS.
ELECTRICALLY OPERATED RELEASING DEVICE FOR WEIGHING MACHINES.
APPLICATION FILED JAN. 21, 1919.
1,339,539.
Patented May 11, 1920.
4 SHEETS—SHEET 1.
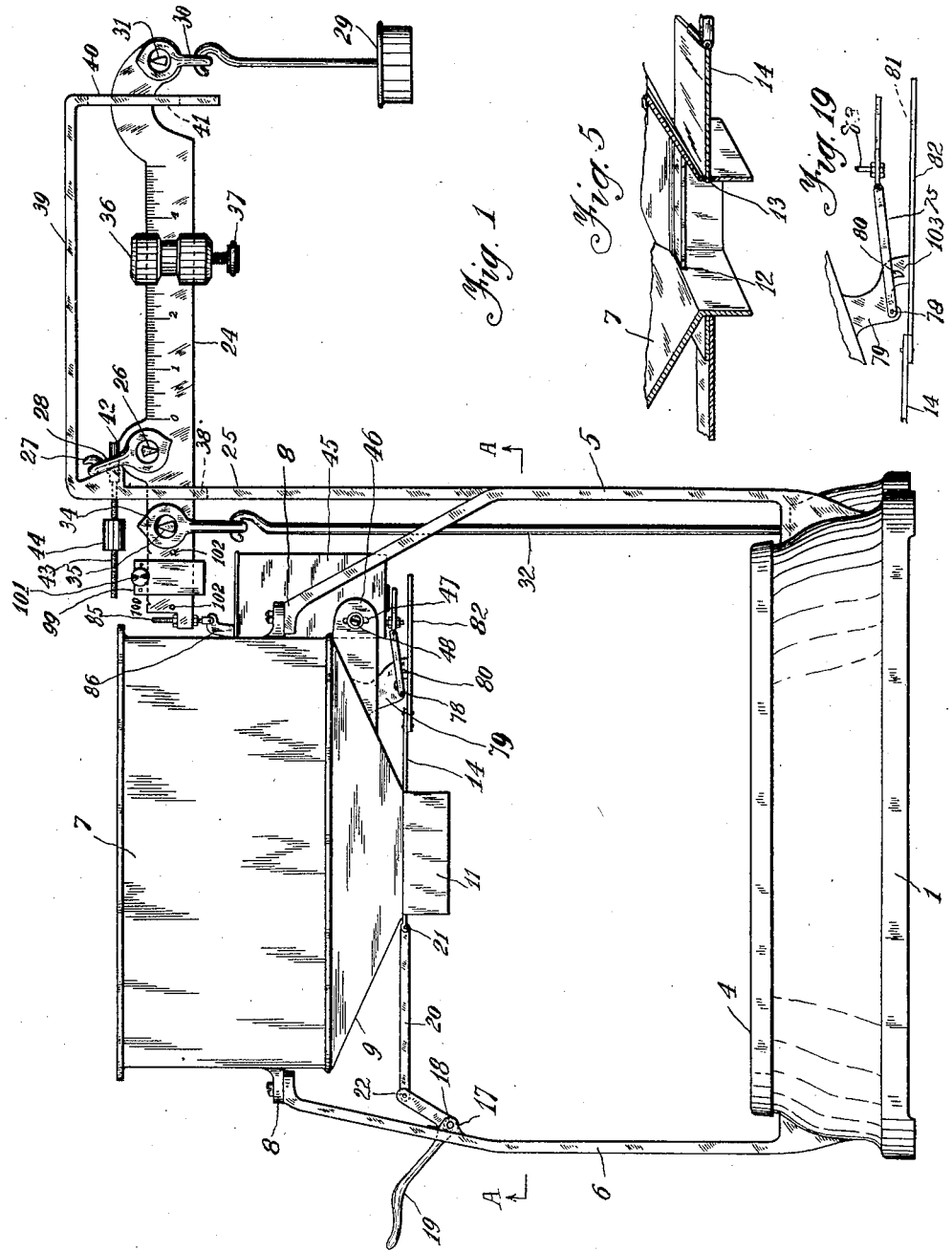

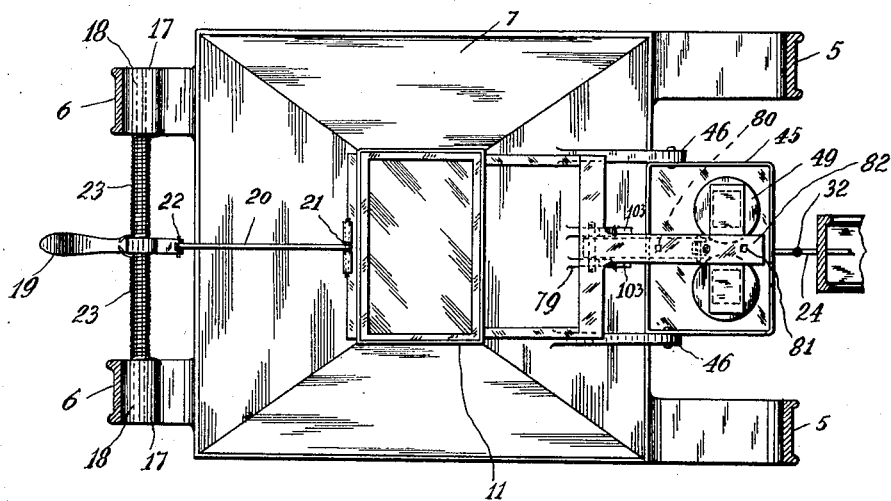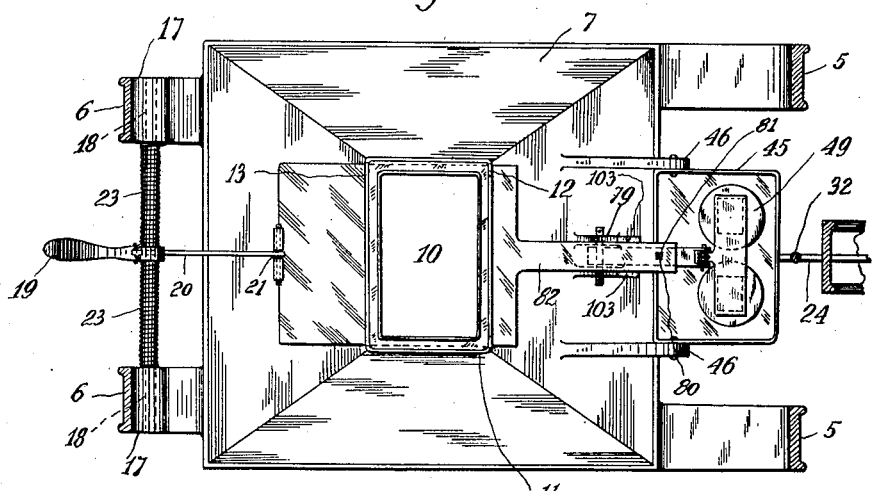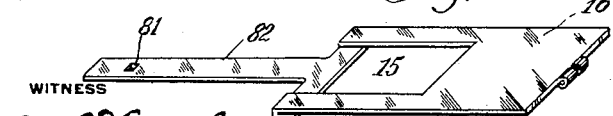

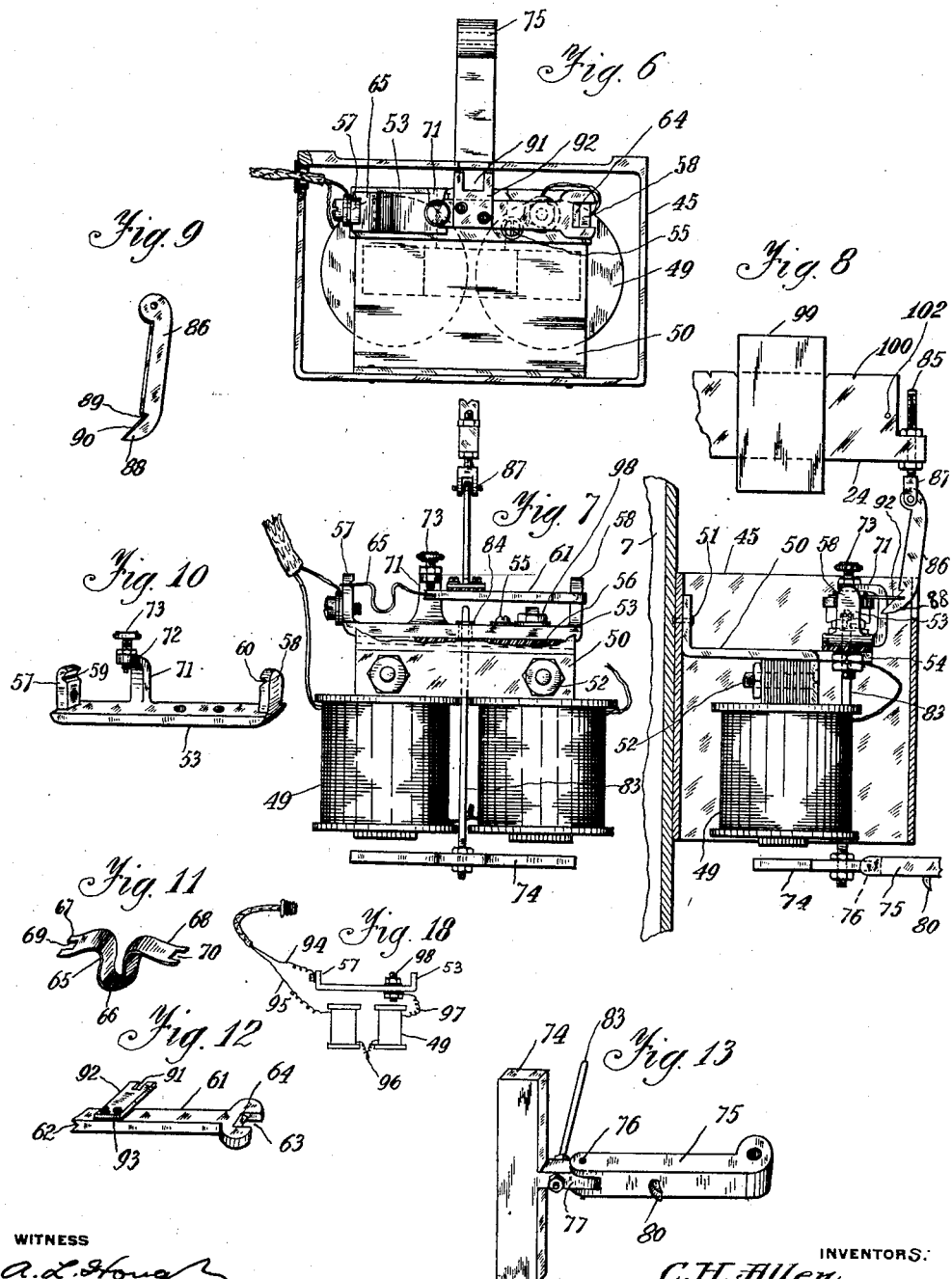

C. H. ALLEN AND J. L. MORRIS.
ELECTRICALLY OPERATED RELEASING DEVICE FOR WEIGHING MACHINES.
APPLICATION FILED JAN. 21, 1919.

1,339,539.

Patented May 11, 1920.
4 SHEETS—SHEET 4.

WITNESS

INVENTORS:
C. H. Allen,
J. L. Morris.

UNITED STATES PATENT OFFICE.

CHARLES H. ALLEN, OF PITTSBURGH, AND JOLLY L. MORRIS, OF CRAFTON, PENNSYLVANIA.

ELECTRICALLY-OPERATED RELEASING DEVICE FOR WEIGHING-MACHINES.

1,339,539.  Specification of Letters Patent.  Patented May 11, 1920.

Application filed January 21, 1919. Serial No. 272,263.

*To all whom it may concern:*

Be it known that we, CHARLES H. ALLEN and JOLLY L. MORRIS, citizens of the United States, residing at Pittsburgh and Crafton, in the county of Allegheny and State of Pennsylvania, have invented certain new and useful Improvements in Electrically-Operated Releasing Devices for Weighing-Machines; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in weighing scales and more particularly to that type of weighing scales commonly known as the counter platform scales.

The primary object of this invention is to provide a weighing scales of the class specified which will automatically weigh a predetermined quantity of any free flowing commodity as it is supplied from a hopper or bin.

Another important object of this invention is to provide an electrically operated weighing scales embodying compensating means for accurately weighing a predetermined quantity of any free flowing commodity regardless of the weight thereof relative to its bulk.

Other objects of this invention are to provide a device of the character described which is comparatively simple in its construction and arrangement, strong, durable and efficient in its use and inexpensive to manufacture.

To the accomplishment of these and such other objects as may hereinafter appear, the invention consists of the novel construction, combination and arrangement of parts herein specifically described and illustrated in the accompanying drawings wherein is shown an embodiment of the invention.

In the drawings forming a part of this specification and wherein like numerals of reference designate corresponding parts throughout the several views:

Figure 1 is a side elevational view of the weighing scales, incorporating our invention therein.

Fig. 2 is a view on line A—A, Fig. 1, illustrating the shutter in the closed position, while Fig. 3 shows a similar view with the shutter in the open position.

Fig. 4 is a perspective view of the shutter.

Fig. 5 is a sectional perspective view of the hopper with parts broken away.

Fig. 6 is a top view of the electrical mechanism.

Fig. 7 is a front elevational view of the electro-magnets and associated parts, and Fig. 8 is a side view thereof.

Fig. 9 is a perspective view of the trigger.

Fig. 10 is a perspective view of the contact bar support.

Figs. 11 and 12 are perspective views of the spring and contact bar, respectively.

Fig. 13 is a perspective view of the armature and associated parts.

Fig. 18 is a diagrammatical view of the electrical connections, and

Fig. 19 is an enlarged detail view of the shutter control mechanism.

Figure 14:
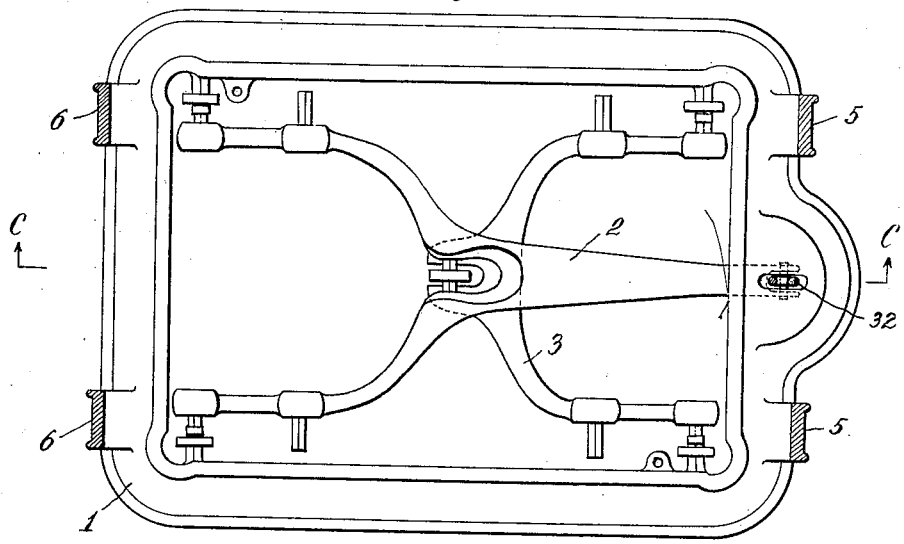
Fig. 14 is a top view of the base with the platform removed.
Figure 15:
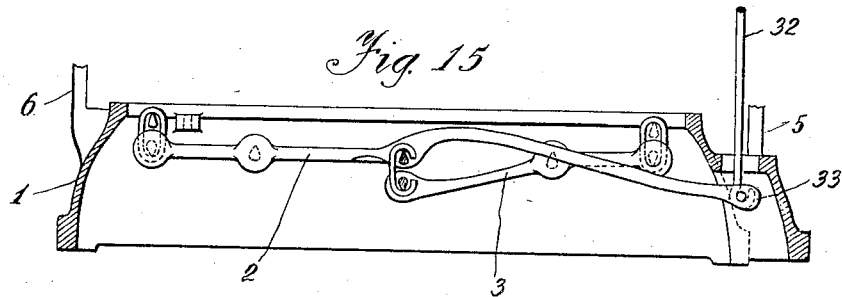
Fig. 15 is a sectional view on line C—C of Fig. 14.
Figure 16:
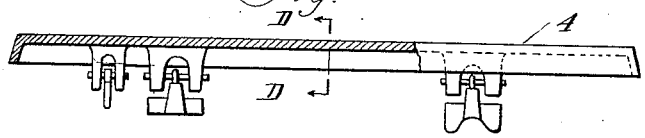
Fig. 16 is a side view of the platform and associated parts, with a portion in cross section.
Figure 17:
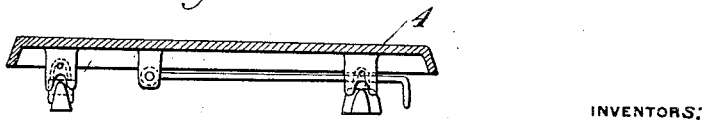
Fig. 17 is a sectional view on line D—D of Fig. 16.

Referring more in detail to the drawings, there is shown in Fig. 1 the counter platform scales, comprising the base 1, in which the long lever 2 and the short lever 3 are mounted. The platform 4 is carried by the levers 2 and 3. The construction, arrangement and operation of the base 1, levers 2 and 3, and the platform 4, are identical to those of the weighing scales of this type now commonly in use.

Formed integrally with the base 1, or secured thereto in any suitable manner, are the front vertical supports 5 and the rear vertical supports 6, which carry the hopper 7 attached thereto as shown at 8. The hopper 7 is constructed with an inclined converging bottom 9 terminating with the exit opening 10, in which the surrounding depending neck 11 is connected. The front and rear walls of the neck 11 are provided with the parallel slots 12 and 13, respectively, which are adapted for the reception of the horizontally sliding shutter 14. The opening 15 formed in the front of the shutter 14 is commensurate in area to the exit opening 10 and the rear portion 16 of the shutter 14 will completely close the same. The shutter 14 being slidably movable in the slots 12 and 13, it will be obvious that such movement will either entirely close or open the exit opening 10, depending upon the direction of the shutter movement.

Suitably journaled at 17 in the rear supports 6, is the horizontally extending shaft 18 upon the center of which the manually operated bell-crank lever 19 is fixedly mounted. The connecting rod 20 pivotally connects the shutter 14 at 21 to the bell-crank lever 19 at 22.

Mounted upon the shaft 18, on either side of the bell-crank lever 19, are the coil springs 23. The ends of these springs are respectively secured to the bell-crank lever 19 and to the rear supports 6 in such a manner that the tension of the springs 23 will be augmented when the bell-crank lever 19 is drawn back and the opening 15 of the shutter 14 is brought to register with the exit opening 10 in the hopper 7.

The graduated beam 24 is suspended in the usual manner in the vertical standard 25 by means of the knife edge bearing pins 26 and the clevis 28 which is carried on the hook 27. The usual counter weight 29 is suspended at the front end of the beam 24 by the clevis 30 in conjunction with the knife edge bearing pins 31. The beam rod 32, pivotally connected to the long lever 2 at 33, is connected to the beam 24 in rear of the standard 28 by the clevis 34 and the knife edge bearing pins 35 in the usual well known manner. The beam 24 is provided with a slidable poise 36 having a tightening thumb screw 37 mounted therein for the purpose of holding the poise 36 in the set position when desired.

The standard 25 is constructed with the slot 38, for the passage of the rear end of the beam 24 therethrough, and the horizontally extending portion 39 having a depending end 40 which is provided with the slot 41 for the passage of the front end of the beam 24.

The enlarged portion 42 of the beam 24 and in which the knife-edge bearing pins 26 are mounted, carries the rearwardly extending threaded rod 43 which extends through the slot 38 in the standard 25 and carries the adjustable balance weight 44 thereon.

The foregoing description of the weighing scales does not differ substantially from the usual weighing scales construction and the application of the automatic mechanism incorporated therein will now be described.

To the front side of the hopper 7 is attached the casing 45 by means of the supporting brackets 46. The ends of these brackets 46 are provided with the elongated slots 47 through which the screws 48 secure the casing 45 thereto. The elongated slots 47 permit the vertical adjustment of the casing 45 in the brackets 46.

The electro-magnets 49 are secured in the casing 45 by the bracket 50, rivets 51 and the bolts 52 as shown in Fig. 8 of the drawings. The contact bar support 53 is fixedly mounted on the integrally formed forwardly extending portion 54 of the bracket 50, by the screws 55, but insulated therefrom by the insulation 56 interposed between the bracket portion 54 and the bar support 53. The contact bar support 53 is formed with integrally formed upright members 57 and 58, and sharp V-shaped notches 59 and 60 are provided adjacent to the top ends thereof, respectively. The contact bar 61 is provided at one end with the sharp V-shaped notch 62, the other end being enlarged and provided with an open slot 63 having a knife edge side 64. The knife edge 64 of the contact bar 61 is adapted to seat in the notch 60 of the contact bar support 53 and the slot 63 to engage the sides of the upright member 58 to prevent the lateral movement of the contact bar 61 when seated therein. The spring 65 comprises a U-shaped portion 66 provided with angularly disposed end portions 67 and 68. These end portions 67 and 68 are formed with the open knife edge slots 69 and 70, respectively, the former to seat in the notch 59 of the contact bar support 53, and the latter in the notch 62 of the contact bar 61. When the contact bar 61 and the spring 65 are mounted in the contact bar 53, as hereinabove described and illustrated in Fig. 7 of the drawings, the buckling point of the contact bar 61, vertically, will be intensely sensitive.

The bar support 53 has a vertical arm 71 with the end 72 thereof bent rearwardly in which the adjusting screw 73 is mounted for the purpose of limiting the vertical movement of the contact bar 61 upwardly.

The armature 74 is positioned directly beneath the electro-magnets 49 and is carried by the gravity lever 75 which is pivotally connected at 76 to the arm 77 formed integrally with the armature 74. The other end of the gravity lever 75 is pivotally connected at 78 between the lugs 79 which are firmly fixed to the hopper 7. The lower side of the gravity lever 75 is provided with the catch pin 80 and is adapted to engage in the aperture 81 in the forwardly extending arm 82 of the shutter 14 and hold the latter, relative to the exit opening 10 in the hopper 7, in the open position. The gravity lever 75 normally rests upon the arm 82 of the shutter 14 and prevents its tendency to swing downwardly, while the lower surface portions 103 of the lugs 79 at all times slidably engage the arms 82, as shown in Fig.

19 of the drawings, to prevent the upward movement of the arm 82, when the catch pin 80 is released during the weighing operation.

A vertical rod 83 rigidly mounted for vertical adjustment is carried by the arm 77 of the armature 74 and extends vertically through the insulated aperture 84 in the forwardly extending portion 54 of the bracket 50 and in the contact bar support 53. The rod 83 is provided to force the contact bar 61 upwardly when the electro-magnets 49 are energized after the weighing operation, and also for the purpose of holding the armature 74 in alinement.

An adjustable bearing bolt 85 is mounted on the extreme rear end of the beam 24 to which the trigger 86 is swingingly connected as shown at 87.

The trigger is so connected to the bearing bolt 85 as to hang off center with a tendency to swing forwardly, and has a rounded forwardly extending lower end 88 formed with the detent 89. The trigger 86 is adapted to move vertically when the beam 24 is raised or lowered and the flat portion 90 of the forwardly extending lower end 88 will at all times be engaged in the slot 91 of the trigger bar 92 which is carried by the contact bar 61 but insulated at 93 therefrom.

Electrical connections for operating the mechanism herein described are clearly shown in Fig. 18 of the drawings, and electro-magnets 49 may be wound to use current from batteries or take same directly from the ordinary house current.

Wire connections 94 and 95 from the main source of energy connect to the upright member 57 and to one of the electro magnets 49 respectively. Connection 96 connects the two electro-magnets together and wiring connection 97 connects the other of the electro-magnets 49 with the insulated binding post 98 mounted in the contact bar support 53.

For accurately weighing the different commodities having a variation in weight relative to the bulk, there is provided a compensating weight 99 slidably mounted upon the rear end of the beam 24. The adjustment of the compensating weight 99 upon the rear end of the beam 24 compensates for the weight of the stream of the commodity which at the moment, flows from the neck 11 of the hopper 7 to the container (not shown) on the platform 4, after the exit opening 10 in the hopper 4 has been closed.

For the convenience of the operator the rear end of the beam 24 may be provided with the notches 100, which are so graduated as to compensate the weights of the various commodities when the weight 99 is adjusted to register therewith. When the weight 99 has been properly adjusted upon the rear end of the beam 24 it may be locked in the adjusted position by means of the thumb screw 101 mounted therein. If it is desired to further facilitate the adjustment of the weight 99 upon the rear end of the beam 24, the notches 100 may be indexed and a reference tabulation, showing the notches to be used for the various commodities, may conveniently be shown at any pertinent position on the weighing machine.

Pins 102 are provided on both sides of the compensating weight 99 on the beam 24 to limit the movement of the weight 99 thereon and prevent any possible interference of the weight 99 with the mechanism of the weighing scales.

In practice the operation of the weighing scales is as follows: The hopper 7 is filled with a commodity, and a container is placed beneath the neck 11 of the hopper 7 upon the platform 4. The poise 36 is moved to indicate the desired weight upon the graduated beam 24 and locked thereon by the thumb screw 37. The compensating weight 99 is adjusted to the proper notch indicated for compensating the used commodity weight and locked by the screw 101.

Normally the contact bar 61 will be in the upward position limited from further upward movement by the screw 73, and the rounded forwardly extending portion 88 of the trigger 86 will dangle idly in the slot 91 of the trigger bar 92. By manually drawing back the bell crank lever 19 pivotally connected to the shutter 14 by the connecting rod 20, the shutter 14 will be actuated to slide rearwardly in the slots 12 and 13 in the neck 11, and the opening 15 in the shutter brought to register with the exit opening 10 in the hopper 7. The hopper 7 is now in the open position and the commodity permitted to flow therefrom to the container upon the platform 4.

The rearward movement of the arm 82, formed integral with the shutter 14 will bring the aperture 81 therein into registration with the catch pin 80, which, being carried by the gravity bar 75, will drop by gravity into the aperture 81 and hold the shutter 14 in the now open position. During the rearward movement of the shutter 14 the springs 23 will have been tensioned with a tendency to force the shutter forward when the catch pin 80 is withdrawn from the aperture 81. When the requisite weight of the commodity shall have passed from the hopper 7 into the container upon the platform 4, the beam 24 forward of the pivoting point will be drawn upwardly, and the portion of the beam 24 in the rear of the pivoting point will be drawn downwardly identically as in well known scales of this type.

The downward movement of the rear end of the beam 24 will also carry the trigger 86 downwardly until the detent 89 engages the trigger bar in the slot 91, causing the sensitively mounted contact bar 61 to buckle downwardly until it strikes the binding post 98 in the contact bar support 53. As soon as the contact bar 61 strikes the binding post 98 a circuit is formed and the electromagnets 49 energized causing the armature 74 to be abruptly drawn upward. The gravity lever 75 being pivotally connected at 76 to the armature 74, the upward movement of the armature will carry with it the gravity lever 75 causing the catch pin 80 to be withdrawn from the aperture 81 and releasing the shutter 14 which will now be forced forwardly by the action of the springs 23 and the portion 16 of the shutter, will have closed the exit opening 10 in the hopper 7.

The upward movement of the armature 74 will further cause the vertical rod 83 carried thereby to strike the contact bar 61 and force it upwardly causing a break in the circuit and carrying the contact bar 61 in its upward or normal position against the screw 73. It will be understood that after the detent in the trigger 86 comes in contact with the part 92, causing the member 61 to buckle to close the circuit, thus energizing the electro-magnet, the trigger will swing idly upon the beam and as the armature is drawn toward the electro-magnet causing the rod 83 to be moved upward against the buckling member, the latter in returning to its highest normal position above its buckling point, will kick against the trigger and hang idly in the slot 91 and in readiness to again perform its function when another quantity of material will have been weighed. The armature 74 when released by the break in the circuit, will again resume its former position supported by the gravity lever 75 and the arm 82 as herein described.

The scales as herein described are primarily intended to facilitate the weighing of commodities in small quantities taken directly from the bulk, and in many instances trade conditions are such as to justify the weighing of hundreds of small quantities of one commodity, thereby obviating the necessity of adjusting the scales for weighing commodities of greater or less specific gravity.

From the foregoing description taken in connection with the accompanying drawings, the advantages of the construction and the method of operation will be readily apparent to those skilled in the art to which the invention appertains, and while describing the principle of operation of the invention together with the device which is now considered to be the best embodiment thereof, it is to be understood that the device shown is merely illustrative and that various changes in the form, proportion and the minor details of construction may be resorted to without departing from the principle of the invention.

What we claim to be new is;

1. An electrically operated slide releasing device for weighing machines, comprising balancing scales, a hopper having an exit opening, a spring pressed slide regulating said opening, an electro-magnet having terminals, a yielding circuit closing member and electrical connections therewith, means connected to the balancing beam of the scales for actuating said member, causing the latter to close the circuit to energize said electro-magnet, mechanism actuated by the movement of the armature of the electro-magnet for releasing said latch, and means for returning said member to its normal position after the electro-magnet has been energized.

2. An electrically operated slide releasing device for weighing machines, comprising balancing scales, a hopper having an exit opening, a spring actuated slide regulating said opening, a circuit closing member, adjustable means carried by the balancing beam of the scales for actuating said member to cause the latter to close the circuit to energize the electro-magnet, a latch for holding said slide open, and means actuated by the armature of the electro-magnet for releasing the latch as the electro-magnet is energized, and means also actuated by the movement of the electro-magnet for causing said circuit closing member to return to its normal position, adjustable means connected to the balancing beam of the scales for moving said member in contact with the terminal of the electro-magnets, said means automatically releasing the member as the electro-magnet is energized, a latch for holding the slide open, and mechanism actuated by the electro-magnet for releasing the latch.

3. An electrically operated slide releasing device for weighing machines, comprising balancing scales, a hopper having an exit opening, a spring pressed slide regulating said opening, an electro-magnet having terminals, a yielding circuit closing member and electrical connections between same and winding of the electro-magnet, a hook and adjustable connections between the same and the balancing beam of the scales, means attached to said circuit closing member which is adapted to be actuated by said hook as the beam of the scales tilts down to cause said member to contact with terminals of the electro-magnet, and means actuated by the armature of the electro-magnet for returning said member to its normal position as the electro-magnet is energized and releasing the latch.

4. An electrically operated slide releasing device for weighing machines, comprising balancing scales, a hopper having an exit opening, a spring pressed slide regulating said opening, an electro-magnet having a terminal, a yielding circuit closing member and electrical connections between same and winding of the electro-magnet, and means for adjusting said circuit closing member, an adjustable hook connected to the balancing beam of the scales, and means carried by said member adapted to be actuated by the hook as the beam of the scales tilts down, a mechanism connected to the armature of the electro-magnet for returning said member to its normal position as the magnet is energized and releasing said latch.

5. An electrically operated slide releasing device for weighing machines, comprising balancing sales, a hopper having an exit opening, a spring pressed slide releasing said opening, an electro-magnet having a terminal, a yielding circuit closing member and electrical connections between same and winding of the electro-magnet, said member having a slotted plate secured thereto, an adjustable hook mounted upon the balancing beam of the scales adapted to engage and be guided by said plate, as the beam of the scales tilts down causing said circuit closing member to contact with the terminal of the electro-magnet and means actuated by the armature of said electro-magnet for returning said member to its normal position and releasing the latch.

6. An electrically operated slide releasing device for weighing machines, comprising balancing scales, a hopper having an exit opening, a spring pressed slide releasing said opening, a circuit closing member and stationary mounting for one end thereof, a spring pivotally connecting the opposite end of said member with the stationary mounting, a hook pivotally connected to the balancing beam of the scales and adapted to move said member against the terminal as the beam of the scales tilts down, and means actuated by the armature of the electro-magnet as the latter is energized to return said member to its normal position and release the latch.

7. An electrically operated slide releasing device for weighing machines, comprising balancing scales, a hopper having an exit opening, a spring pressed slide releasing said opening, a stationary member having upright notched portions in the adjacent edges thereof, a circuit closing member pivotally engaging one of said notched portions, a bent spring fastened to one end of said member and its other end pivotally connected to the other of said notched portions of the stationary member, a hook having adjustable pivotal connections with one end of the balancing beam of the scales and adapted, as the beam of the scales tilts down, to cause said member to be thrown in contact with the terminal of the electro-magnet and means actuated by the electro-magnet for returning said member to its normal position and releasing said latch.

8. An electrically operated slide releasing device for weighing machines, comprising balancing scales, a hopper having an exit opening, a spring pressed slide releasing said opening, a stationary member having upright notched portions in the adjacent edges thereof, a circuit closing member having a recessed end engaging one of said notches, a spring, one end of which electrically engages its opposite end and the other notch in said stationary member adapted to buckle, as said member tilts down, an adjustable hook connected to the balancing beam of the scales and designed to move said member against the terminal of the electro-magnet, means actuated by the armature of the electromagnet for returning said member to its normal position and releasing the latch.

9. An electrically operated slide releasing device for weighing machines, comprising balancing scales, a hopper having an exit opening, a spring pressed slide regulating said opening, an electro-magnet having a terminal, a yielding circuit closing member, and means carried by the balancing beam of the scales for moving said member in contact with the terminal of the electro-magnet, the armature of the magnet having a lateral extension, and means connected to said extension adapted to return the member to its normal position as the electro-magnet is energized, and means connected to the electro-magnet for releasing the latch in the slide.

10. An electrically operated slide releasing device for weighing machines, comprising balancing scales, a hopper having an exit opening, a spring pressed slide regulating said opening, an electro-magnet having a terminal, a yielding circuit closing member, and means carried by the balancing beam of the scales for moving said member in contact with the terminal of the electro-magnet, the armature of the magnet having a lateral extension, and means connected to said extension adapted to return the member to its normal position as the electro-magnet is energized, a latch pivoted to said extension and adapted to hold the slide open and movable as the armature is actuated to release the latch.

11. An electrically operated slide releasing device for weighing machines, comprising balancing scales, a hopper having an exit opening, a spring pressed slide regulating said opening, an electro-magnet having a terminal, a yielding circuit closing member, and means carried by the balancing beam of the scales for moving said member in contact with the terminal of the electro-magnet, the armature of the magnet having a lateral extension, and means connected to said extension adapted to return the member to its normal position as the electro-magnet is energized, a latch having a stationary pivot at one end and its other end pivoted to the electro-magnet and movable therewith, said latch having a projection adapted to engage an aperture in the slide to hold the same open.

12. An electrically operated slide releasing device for weighing machines, comprising balancing scales, a hopper having an exit opening, a slide movable in suitable guide ways in the hopper, a shaft journaled in suitable bearings, a crank lever fixed to the shaft, a coiled spring mounted upon the shaft and engaging said crank lever, the latter having pivotal connection with the slide, a yielding circuit closing member, an electro-magnet with a terminal thereon, pivotal hook connections with the balancing beam of the scales adapted to engage and move said member in contact with said terminal, means upon the electro-magnet for returning the member to its normal position, a pivotal latch connecting to the armature adapted to engage and hold the slide open, said latch being adapted to be actuated to release the slide as the armature is energized.

In testimony whereof we hereunto affix our signatures in presence of two witnesses.

CHARLES H. ALLEN.
JOLLY L. MORRIS.

Witnesses:
RALPH DONATH,
HARRY KLEBER.